United States Patent
Liu

(10) Patent No.: US 10,146,870 B2
(45) Date of Patent: Dec. 4, 2018

(54) VIDEO PLAYBACK METHOD AND SURVEILLANCE SYSTEM USING THE SAME

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 452 days.

(21) Appl. No.: 14/838,644

(22) Filed: Aug. 28, 2015

(65) Prior Publication Data

US 2016/0065900 A1   Mar. 3, 2016

(30) Foreign Application Priority Data

Aug. 29, 2014   (TW) .............................. 103129946 A

(51) Int. Cl.
*G06K 9/00* (2006.01)
*G06F 17/30* (2006.01)
*G11B 27/00* (2006.01)

(52) U.S. Cl.
CPC .. *G06F 17/30811* (2013.01); *G06F 17/30852* (2013.01); *G06K 9/00604* (2013.01); *G06K 9/00771* (2013.01); *G11B 27/005* (2013.01)

(58) Field of Classification Search
CPC ............ G06K 9/00771; G06K 9/00604; G06F 17/30852; G06F 17/30811; G11B 27/005
See application file for complete search history.

(56) References Cited

U.S. PATENT DOCUMENTS

| | | | | |
|---|---|---|---|---|
| 8,472,791 B2 * | 6/2013 | Gargi | ................... | G11B 27/005 386/239 |
| 2005/0223034 A1 * | 10/2005 | Kaneko | ................... | G06F 21/10 |
| 2008/0253737 A1 * | 10/2008 | Kimura | ................ | G11B 27/005 386/349 |
| 2011/0243377 A1 * | 10/2011 | Casamona | ................ | G06T 7/20 382/103 |
| 2015/0294183 A1 * | 10/2015 | Watanabe | .......... | G06K 9/00771 382/203 |

* cited by examiner

*Primary Examiner* — Joseph G Ustaris
*Assistant Examiner* — Jill D Sechser
(74) *Attorney, Agent, or Firm* — Maschoff Brennan

(57) ABSTRACT

A surveillance system and method are provided. The surveillance system includes a video capturing device and a processing device. The video capturing device obtains a video and generates metadata associated therewith. The metadata records a trajectory of an object appearing in the video. The processing device executes the video playback method, namely to obtain the metadata, define a section on the trajectory based on information of the trajectory, command a player to play the video by a first speed when the object appears on the section, and selectively command the player to play the video by a second speed when the object appears on the trajectory except the section.

17 Claims, 5 Drawing Sheets

VIDEO PLAYBACK METHOD AND SURVEILLANCE SYSTEM USING THE SAME

CROSS-REFERENCE TO RELATED APPLICATIONS

This non-provisional application claims priority under 35 U.S.C. § 119(a) on Patent Application No(s). 103129946 filed in Taiwan, R.O.C. on Aug. 29, 2014, the entire contents of which are hereby incorporated by reference.

TECHNICAL FIELD

The disclosure relates to a video playback method and a surveillance system using the same, more particularly to a method and system for deciding the play speed of a video according to a trajectory of an object.

BACKGROUND

Usually the purpose for the playback of videos in a surveillance system is to search for a certain person, object or event. If a time point where a target object appears or occurs is unknown, users usually prefer to fast forward the playback videos until finding the target object, and then review them in slow motion. On a common playback user interface, users have to suspend the playback videos immediately when finding the target object, and then rewind the video or pull a slider backward till a certain time point of the time line that the target object appears.

During the playback, each action to manually operate the surveillance system, such as pushing buttons, keyboard operation or mouse operation, requires a response time for the human brain to control the hands to do the action in response to visional stimulation. Therefore, such a human response time may not fit in the playback of videos on a machine, especially when users operate the interface wrongly or with confusion. For example, when a user reactively suspends the playback, the playback progress herein may exceed a desired play time point, resulting in that the user must rewind the video to search for the target object again. If forgetting to slow down the playback, the user herein has to rewind the video to search for the target object again. However, no one wants to repeatedly rewind and search again and again until a clip of the video that the target object can be observed clearly is found.

SUMMARY

According to one or more embodiments, the disclosure provides a video playback method. In one embodiment, the video playback method includes acquiring metadata that is associated with a video and records a trajectory of at least one object appearing in the video, defining a section on the trajectory according to information about the trajectory, playing the video by a first speed when the object appears on the section of the trajectory and selectively playing the video by a second speed when the object appears on the trajectory except the section.

According to one or more embodiments, the disclosure also provides a surveillance system for video playback. In one embodiment, the surveillance system includes a video capturing device and a processing device. The video capturing device captures the foregoing video and generates the foregoing metadata. The processing device is electrically connected to the video capturing device and performs the foregoing video playback method.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
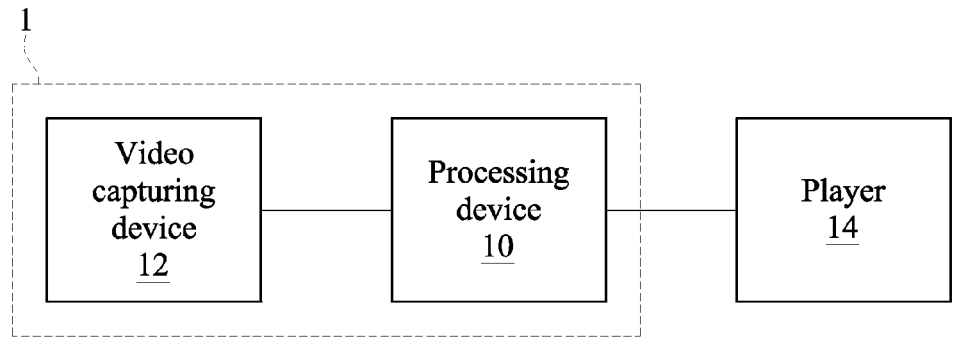
FIG. 1 is a block diagram of a processing system according to an embodiment of the disclosure.

Please refer to FIG. 1, which is a block diagram of a surveillance system 1 according to an embodiment of the disclosure. The surveillance system 1 includes a processing device 10 and a video capturing device 12. The processing device 10 and the video capturing device 12 are coupled to each other, and the processing device 10 is coupled to a player 14. In another embodiment, the player 14 is included in the surveillance system 1. In another embodiment, the processing device 10, the video capturing device 12 and the player 14 are integrated into an apparatus or are separated.

The video capturing device 12 captures a video. In an embodiment, the term "capture" means to record or capture sequential images of the real world. The video capturing device 12 herein includes a camera lens and relative modules. In another embodiment, the term "capture" means to download or receive data from the outside of the surveillance system 1. The video capturing device 12 herein is a computer. After the video is obtained, the video capturing device 12 generates metadata associated with the video. Specifically, the video capturing device 12 is capable of analyzing the content of a video, recognizing at least one object appearing in the video, and recording a trajectory of the at least one object into the metadata. Such an ability of video content analysis is supported by a video analytics engine defined by the open network video interface forum (ONVIF) or by other types of video analytics engine. In an example, the trajectory is recorded in a list, but the disclosure will not be limited thereto. Each data in the list includes a time point and a location of the object in a certain frame of the video at the time point. The time points are indicated by, for example but not limited to, timestamps, the number of each frame of the video, or other identifiers in a certain order. For example, each frame of a video has 800×600 pixels, and the list recites an object appearing at a location with the coordinate $(x_{161}, y_{161})$ in the $161^{st}$ frame of the video, wherein $1 \leq x_{161} \leq 800$ and $1 \leq y_{161} \leq 600$. In another embodiment, the metadata further includes the category, color and/or size of an object to be recognized.

The processing device 10 performs a video play back method to command the player 14 to playback the video. The processing device 10 is any type of present or feature processor, central processing unit (CPU), control unit, microprocessor, microcontroller, certain application-specific integrated circuit, field-programmable gate array, complex programmable logic device, system-on-chip, system-in-package or any hardware component, which has the computing ability and is capable of performing instructions for the video playback method.

The video playback method is carried out by, for example but not limited to, a computer program stored in a computer-readable storage medium so that a computer can perform the video playback method after reading the computer program from the computer-readable storage medium. For instant, the computer-readable storage medium is, but not limited to, a read-only memory, a flash memory, a floppy disk, a hard disk drive, an optical disk, an USB drive, a magnetic tape or other storage mediums having the same function.

Figure 2:
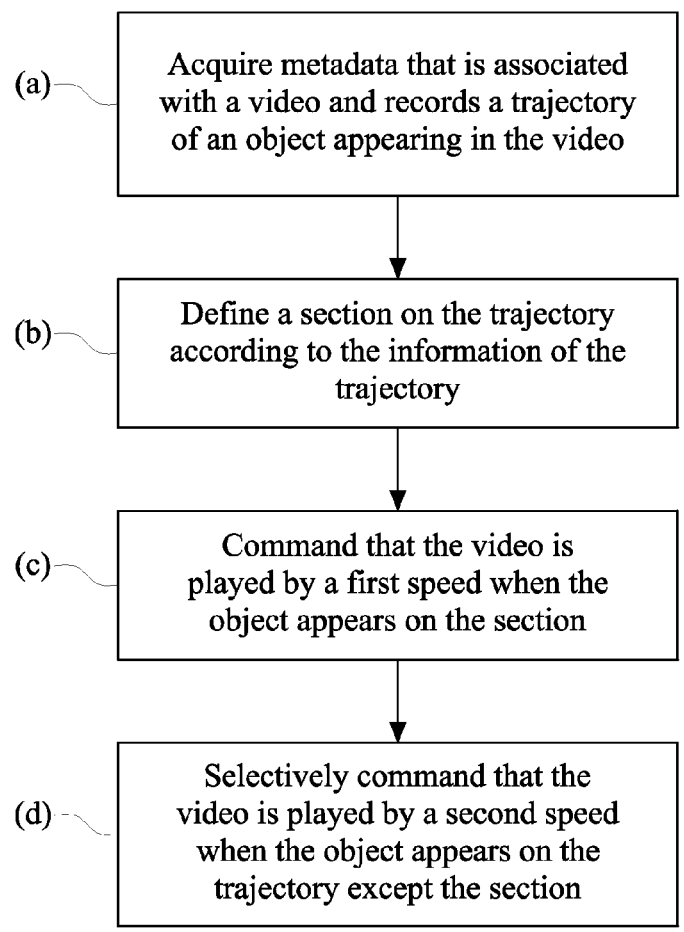
FIG. 2 is a flow chart of a video playback method according to an embodiment of the disclosure.

Please refer to FIG. 1 and FIG. 2 which is a flow chart of a video playback method according to an embodiment of the disclosure. As shown in step (a), the processing device 10 acquires the metadata. In step (b), the processing device 10 defines a section (referred to as an interest section) on the trajectory of the object according to the information of the trajectory of the object in the metadata. Such an interest section of the trajectory is associated with the commands which the processing device 10 sends to the player 14 in steps (c) and (d).

In step (c), the processing device 10 commands the player 14 to play the video by the first speed when the object appears on the section of the trajectory. The first speed is related to a second speed so that the player 14, according to the commands provided by the processing device 10, plays different portions of the video by two different speeds, respectively. In an embodiment, the first speed is slower than the second speed. When the video is played by the second speed (i.e. the relative fast play), the processing device 10 defines a time period for playing the video by the first speed (i.e. the relative slow playback). Therefore, the user may clearly observe an object of interest appearing on the interest section of the trajectory during the defined time period.

In another embodiment of the step (c), the processing device 10 merely appoints a certain section of the trajectory or the trajectory except the certain section and informs the player 14 about a specific task of the appointed part of the trajectory or the time period of the relative slow playback instead of appointing the first or second speed. Therefore, the player 14 can realize the definition of the appointed part of the trajectory and play the frames of the video which the object appears on the interest section of the trajectory, by a certain way (e.g. the first speed) and the reset of frames of the video by another way (e.g. the second speed) after receiving such commands from the processing device 10.

In step (d), the processing device 10 specifically commands the player 14 to play the video by the second speed when the object appears on the trajectory except the section. The step (d) is optionally performed. In an example, the above object is referred to as a first object and the priority of step (c) is higher than the priority of step (d) so that when another object (referred to as a second object) appears, the processing device 10 defines an interest section on a trajectory of the second object in step (b). When the first object leaves from the interest section of its trajectory in the video, the player 14 plays the video by the second speed according to the command in step (d) corresponding to the first object. Meanwhile, the second object appears on the interest section of its trajectory in the video, so the player 14 should play the video by the first speed according to the command in step (c) corresponding to the second object. However, such two commands in steps (c) and (d) are incompatible with each other, so the command in step (c) will be selected. In other words, whenever an object appears on the interest section of its trajectory in the video, the player 14 will play the video by the first speed. When all objects appearing in the video leave from their interest sections in step (d), the player 14 will play the video by the second speed.

The processing device 10 may specifically command the player 14 through their connection. In an embodiment, the player 14 is separated from the surveillance system 1 so the processing device 10 may not know the existence of the player 14 (i.e. lack of the connection between the processing device 10 and the player 14 as shown in FIG. 1). Accordingly, if any device obtains the information about the interest section stored in the metadata or other files, this device can display the video according to the obtained information. The steps (c) and (d) are performed based on the standard in the art in an embodiment or based on the communication scheme between the processing device 10 and the unknown player 14, such as a certain data format or protocol.

On the other hand, the player 14 receives the video from the processing device 10 or from the video capturing device 12 (if coupled to the video capturing device 12) or receives the metadata or non-appointed commands from the video capturing device 12 or the processing device 10. In an example, the player 14 is a computer including a module capable of displaying or outputting frame images, and these displayed or output frame images may present a playing interface. In another example, the player 14 includes a physical interface module. Moreover, the player 14 plays the video forward or backward according to the received commands.

The step (b) is performed based on the information about the trajectory of the object (hereinafter referred to as the trajectory information of the object), and this trajectory information is derivative data of the trajectory recorded in the metadata. The following one or more embodiments will, by referring the foregoing drawings, illustrate how to define one or more interest sections of the trajectory presented in the video played by the first speed.

Figure 3A:
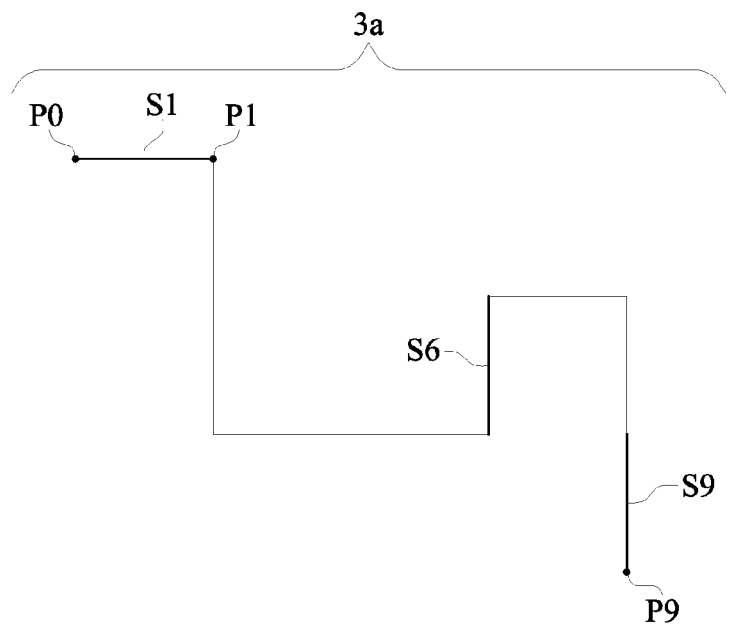
FIGS. 3A to 3G are schematic diagrams of trajectories of an object in a video according to various embodiments of the disclosure.

Please refer to FIG. 3A, which is a schematic diagram of a trajectory 3a of an object on a video according to an embodiment of the disclosure. The object appears at a location P0 in the video and disappears at a location P9 in the video. The trajectory information includes spaces or locations of the object at multiple time points so that the processing device 10 can define at least one interest section according to this information and control the player 14 to play the video by the first speed when the object enters into or leaves this interest section. For example, the sections S1 and S9 shown in the drawing are set as interest sections.

In an embodiment, when the object appears on the sections S1 and S9, the player 14 plays the video by the same first speed or by different first speeds which respectively correspond to the sections S1 and S9. In an embodiment, the first speed corresponding to the section S1 or S9 is a constant value or a variable value. For example, assume the fast play of the video is under the second speed and the slow play of the video is under the first speed. Then, when the object moves from the location P0 to the location P1, the video is played by the first speed that is gradually increasing from a minimum value at the location P0 to the second speed at the location P1.

In an embodiment, the processing device 10 merely marks the interest sections, the details of playing the video are defined by the player 14 or users. The disclosure will have no limitation on the lengths of the sections S1 and S9.

Figure 3B:
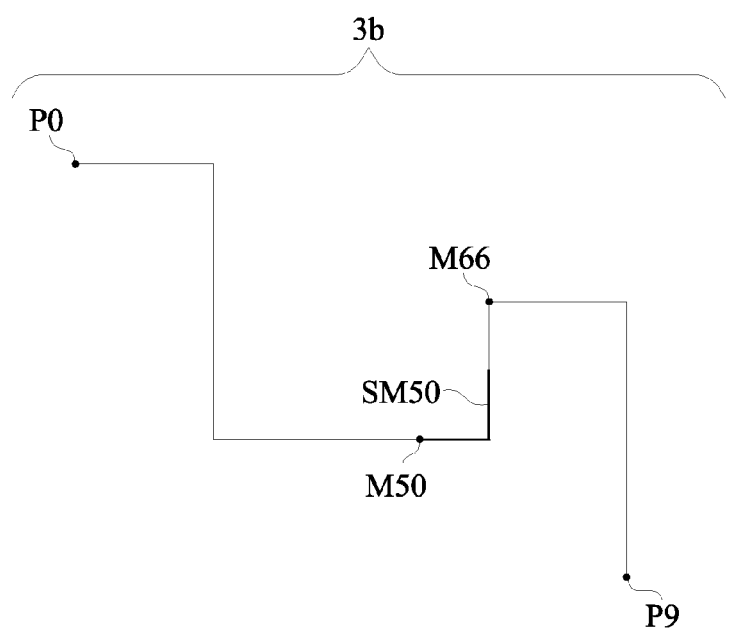

Please refer to FIG. 3B, which is a schematic diagram of a trajectory 3b of an object on a video according to an embodiment of the disclosure. Similar to the object in FIG. 3A, an object in FIG. 3B appears at the location P0 and disappears at the location P9 in the video. The processing device 10 estimates a middle point M50 of the trajectory 3b in length according to a plurality of locations of the object in the video and defines an interest section extending from the middle point M50. This interest section includes the middle point M50.

In an embodiment, the middle point M50 is at the central of the interest section. In another embodiment, the interest section is a section SM50 that extends by a certain length from the middle point M50 toward the location P9 along the trajectory 3b. In another embodiment, the interest section is a portion of the trajectory 3b, which extends by a certain length from the middle point M50 toward the location P1 along the trajectory 3b. In an embodiment, the interest section is a portion of the trajectory 3b, which extends by a first length from the middle point M50 toward the location P1 and also extends by a second length from the middle point M50 toward the location P9 along the trajectory 3b, and the first length and the second length are different.

The trajectory 3b includes one or more middle points. In an embodiment, the above middle point M50 is a special case among the middle points of the trajectory 3b. In another embodiment, the middle point is a certain equipartition point of the trajectory 3b in length, e.g. a trisection point M66. In another embodiment, the middle point is any point of the trajectory 3b.

In this way, according to such one or more middle points, the processing device 10 can define one or more interest sections for playing the video by the first speed.

In order to simplify the selection of the one or more middle points, a frame can be divided into a plurality of regions, and an interest section of a trajectory in step (b) can be defined according to one of the regions of the frame. Please refer to FIG. 3C, which is a schematic diagram of a trajectory 3c of an object on a video according to an embodiment of the disclosure. A frame of the video is at least divided into three regions A10, A20 and A30. In the metadata, the information about the section S10 corresponds to the information about the region A10, and the information about the section S30 corresponds to the information about the region A30. Accordingly, the trajectory information can be simplified.

Figure 3C:
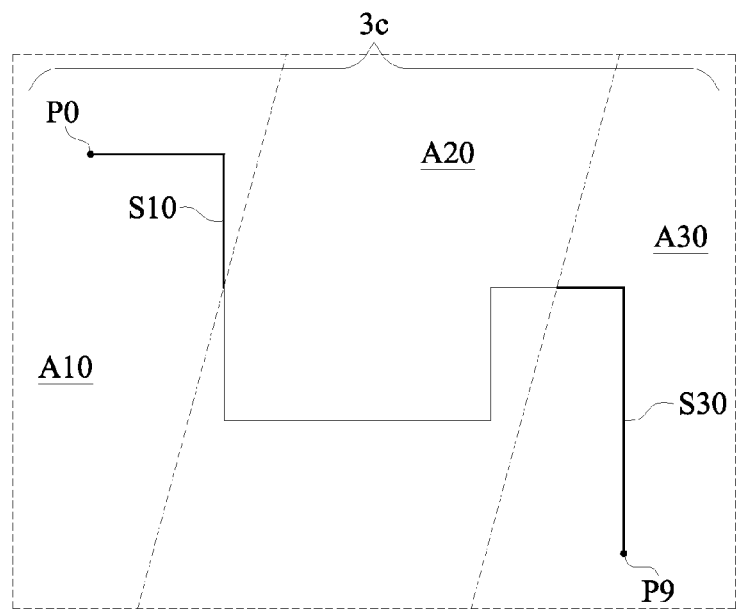
Figure 3D:
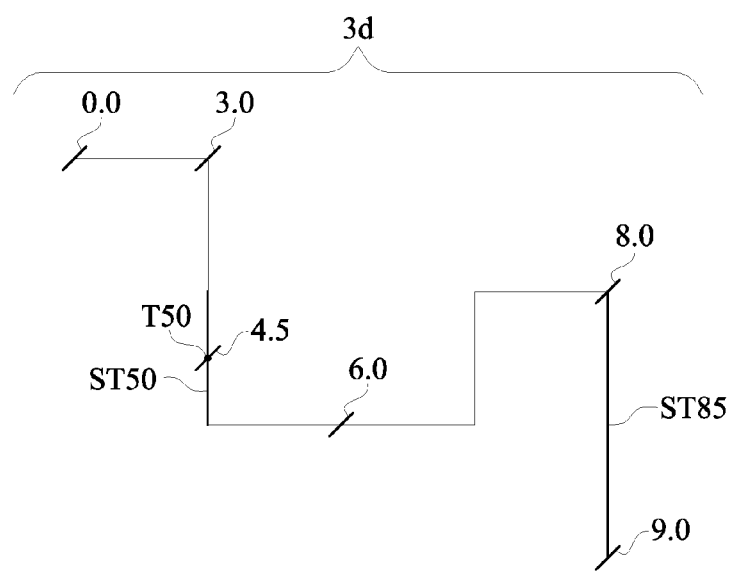

Each of the location of the object has a corresponding time point in FIG. 3B. Please refer to FIG. 3D, which is a schematic diagram of a trajectory 3d of an object on a video according to an embodiment of the disclosure. In this embodiment, the trajectory 3d includes a plurality of time points. An object appears in the video at a time point 0.0 and disappears at a time point 9.0. The processing device 10, according to the time points, estimates a location T50 of the object corresponding to a middle time point 4.5 and then defines a section ST50 covering the location T50 according to the locations of the object corresponding to the time points on the trajectory 3d. The middle time point 4.5 is a special case among the one or more middle time points related to the trajectory 3d. The middle time point can be a certain equipartition time point related to the trajectory 3d. For example, the middle time point is a trisection time point 3.0 or 6.0 or is any time point related to the trajectory 3d, such as a time point 8.0. In FIG. 3A or 3C, the processing device 10 selects a middle time point that the object just appears or disappears on the screen, and then defines an interest time period, such as a time period ST85 of 1.0 (i.e. 9.0−8.0=1.0) unit time which is a final period that the object exists in the video.

Figure 3E:
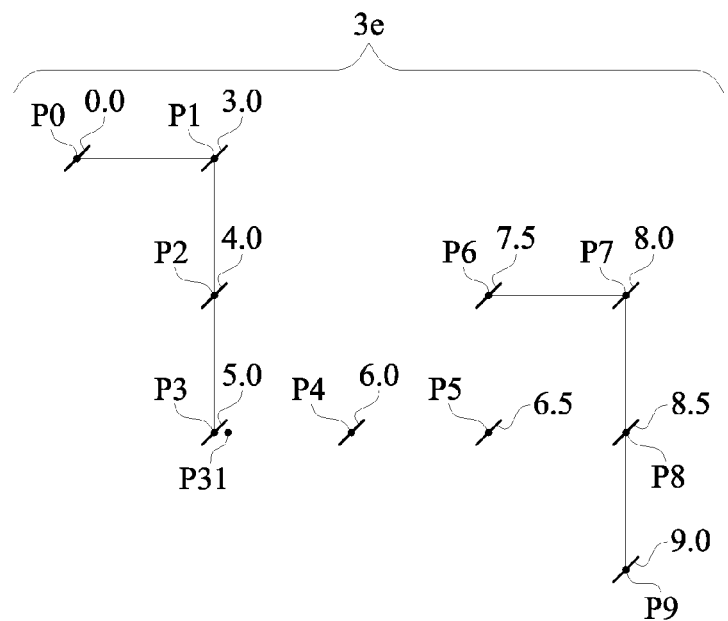

Please refer to FIG. 3E, which is a schematic diagram of a trajectory 3e of an object on a video according to an embodiment of the disclosure. This embodiment in FIG. 3E is a combination of the embodiments in FIGS. 3B and 3D. That is, the processing device 10 estimates a middle point according to the locations of the object weighted by time points. In FIG. 3E, the trajectory 3e has a spatial length of 9 units, where there is an interval of 1 unit between the locations P0 and P1, between the locations P1 and P2, between the locations P2 and P3, between the locations P3 and P4, between the locations P4 and P5, between the locations P5 and P6, between the locations P6 and P7, between the locations P7 and P8, and between the locations P8 and P9. The object moves along the trajectory 3e by non-uniform motion according to the time points 0.0 to 9.0. Therefore, a middle point of the trajectory 3e weighted is an unit distance of 3.1 (i.e. 0.5×(3.0−0.0)+1.5×(4.0−3.0)+2.5×(5.0−4.0)+3.5×(6.0−5.0)+4.5×(6.5−6.0)+5.5×(7.5−6.5)+6.5×(8.0−7.5)+7.5×(8.5−8.0)+8.5×(9.0−8.5)]÷9.0≈3.1) away from the location P0 and is a location P31 between the locations P3 and P4. According to the information of the middle point P31, the processing device 10 defines an interest section of the trajectory 3e, and this interest section is related to a position in screen where the object averagely took a longest time on traveling. In view of the locations P0 to P9, a part of the trajectory 3e that the object moves the slowest in the video, is defined as an interest section and is between the locations P0 and P1 and corresponds to 3.0 (i.e. 3.0−0.0=3.0) unit time in an embodiment. In another embodiment, the weighted calculation of middle points is carried out by other weight arrangement methods, such as enhancing the weight of an important location or the weight of an important time point.

Figure 3F:
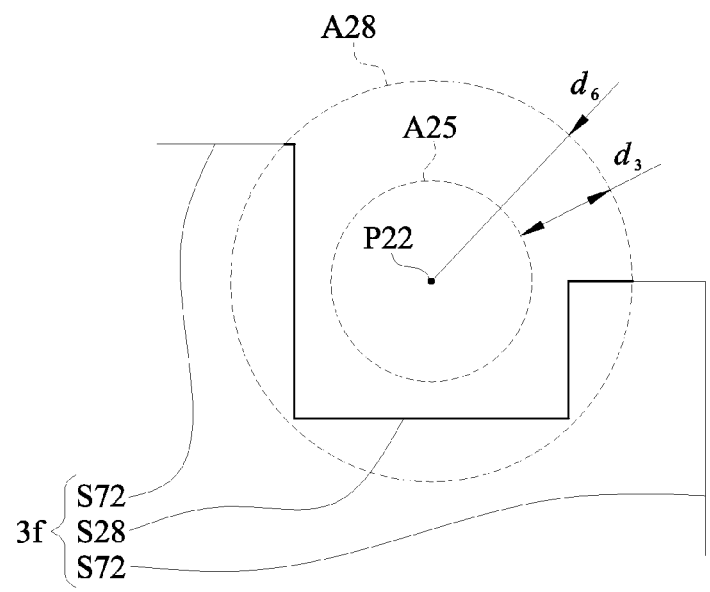

Please refer to FIG. 3F, which is a schematic diagram of a trajectory 3f of an object on a video according to an embodiment of the disclosure. When the processing device 10 under the video playback method detects that the trajectory 3f at least overlaps a part of a region A28 of a frame, the step (b) is performed.

The region A28 is defined by a various ways. In an embodiment, the region A28 is a region of interest so that the processing device 10 defines a part of the trajectory 3f covered by the region A28 to be an interest section, i.e. a section S28. In another embodiment, a region A25 of a frame is set as a region of interest that is smaller than the region A28 and slightly overlaps or does not overlap the trajectory 3f, so that the processing device 10 defines a section S28 of the trajectory 3f that is close to the region A25, to be an interest section. Herein, the term "close to" indicates that a part of the trajectory 3f has a space, which is equal to or less than a buffer distance d3, with the region A25. In another embodiment, the location P22 is a location of interest so that the processing device 10 defines a section S28 of the trajectory 3f which is close to the location P22, to be an interest section. Herein, the term "close to" indicates that a part of the trajectory 3f has a space that is equal to or less than a buffer distance d6, with the location P22. In another embodiment, the region A28 is a region of interest so that the processing device 10 defines the trajectory 3f except a section S28 to be an interest section, i.e. a section S72.

As set forth above, the processing device 10 performs the step (b) according to at least one of the foregoing considerations for a trajectory. In one dimension, a trajectory is indicated with points or locations, by referring to the embodiments shown in FIGS. 3B, 3C, 3D and 3E.

Moreover, the trajectory information includes a direction, length, pattern or other characteristics of the trajectory. In an embodiment based on the trajectory 3a, the interest section defined by the processing device 10 has directionality. For example, the section S6 in FIG. 3A extends toward the upper side of the drawing.

In addition, a part of the trajectory matching a certain condition such as length or pattern is defined as an interest section for the player 14 to play the video by the first speed when the object appears on the interest section.

Figure 3G:
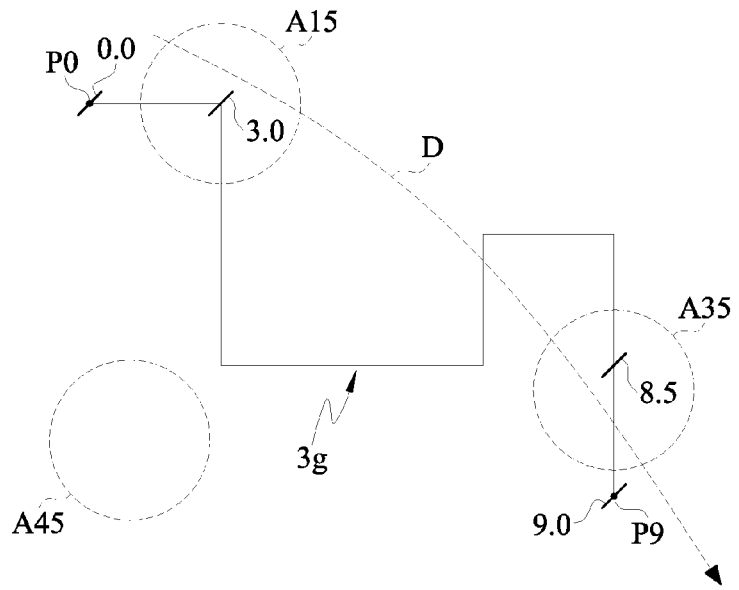

However, the interest section corresponds to a part or the whole of time during which the object appears in the video. Please refer to FIG. 3G, which is a schematic diagram of a trajectory 3g of an object on a video according to an embodiment of the disclosure. An object appears at a location P0 in the video at a time point 0.0 and disappears at a location P9 in the video at a time point 9.0. In this embodiment, there are a preset region A15 and a preset region A35 on the frame. In the video playback method, the processing device 10 detects that the trajectory 3g overlaps at least a part of the region A15 and a part of the region A35.

When the object first appears in the region A15 at a time point 3.0 and then enters into the region A35 at a time point 8.5, the processing device 10 performs the step (b). In other words, when the trajectory 3g crosses the regions A15 and A35 and the pattern of the trajectory 3g substantially matches a pattern D having directivity, the step (b) is performed. In an example, the video capturing device 12 is a surveillance camera installed among public areas (e.g. the region A15) and private areas (e.g. the regions A35 and A45) in a company. In general, a human-shaped object traveling in the private regions A35 and A45 should be a reliable employee. Once a guest enters into the private region A35 from the public region A15 without any authorization and may damage the company security, it is necessary for the company to play a surveillance video by a first speed in order to monitor the trajectory (e.g. the trajectory 3g) of every human-shaped object, especially to monitor a section of the trajectory in which an entrance guard is set.

In some embodiments, there are more preset regions set in the screen, and these regions to visit can be arranged in a certain order according to actual application requirements in order to set the basis of performing the step (b).

In an embodiment, a part of a trajectory formed by a specific object that belongs to a specific category or has a specific color or size, is set as an interest section. For example, the processing device 10 can perform the video processing to a trajectory formed by a specific human having a certain skin color or stature, rather than to trajectories formed by other objects except the human, such as a car.

In an embodiment, a certain section of a trajectory matching a specific condition is set as an interest section if an object appears thereon. For example, the video capturing device 12 can recognize human faces, the metadata has relative information, and the processing device 10 can accordingly command that the video is played by the first speed when any object is recognized as having a human face.

Figure 4:
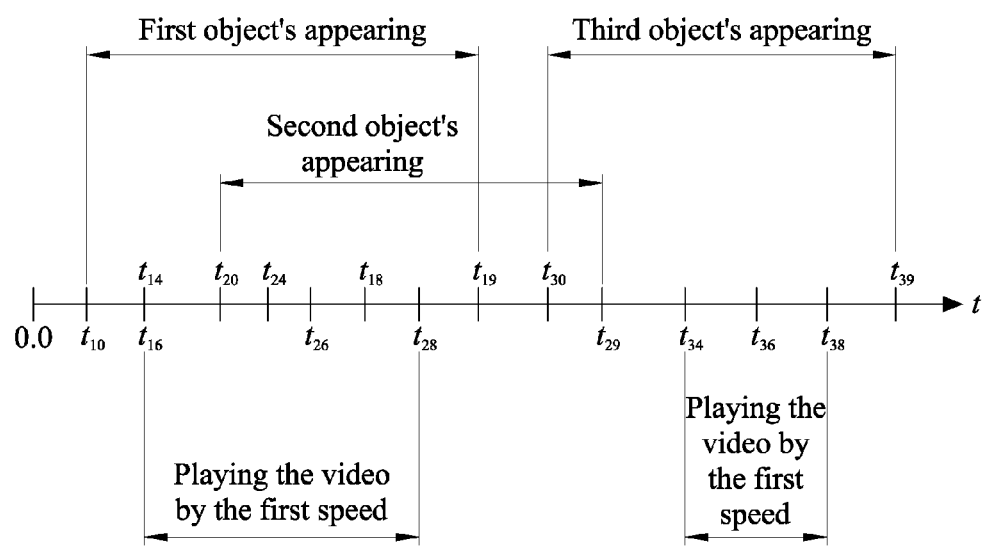
FIG. 4 is a schematic diagram of a timeline of a video according to an embodiment of the disclosure.

Please refer to FIGS. 1 and 2 and FIG. 4, which is a schematic diagram of a timeline of a video according to an embodiment of the disclosure. A first object appears between a time point $t_{10}$ and a time point $t_{19}$, A second object appears between a time point $t_{20}$ and a time point $t_{29}$, and a third object appears between a time point $t_{30}$ and a time point $t_{39}$.

In an embodiment, the processing device 10 defines an interest time period between a time point $t_{14}$ and a time point $t_{18}$ according to a time point $t_{16}$ corresponding to a middle point of a trajectory of the first object. The time point $t_{14}$ overlaps the time point $t_{16}$, and the value of the time point $t_{18}$ is the value of the time point $t_{16}$ plus a certain value. In another embodiment, the processing device 10 defines an interest time period between a time point $t_{34}$ and a time point $t_{38}$ according to a time point $t_{36}$ corresponding to a middle point of a trajectory of the third object. The value of the time point $t_{34}$ is the value of the time point $t_{36}$ minus a certain value, and the value of the time point $t_{38}$ is the value of the time point $t_{36}$ minus another certain value. In another embodiment, the processing device 10 defines an interest time period between a time point $t_{24}$ and a time point $t_{28}$ according to any time point, e.g. a time point $t_{26}$, corresponding to any middle point of a trajectory of the second object. In another embodiment, the processing device 10 defines an interest time period between the two time points $t_{24}$ and $t_{28}$ according to none of the middle points of the trajectory of the second object.

In an embodiment, the time period between the time points $t_{18}$ and $t_{14}$, the time period between the time points $t_{28}$ and $t_{24}$, and the time period between the time points $t_{38}$ and $t_{34}$ are equal to or less than a time period threshold so that the time period for playing the video by the first speed will be limited. For the first object, such a time period threshold is equal to the certain value for estimating the interest time period according to the time point $t_{16}$. For the third object, a half of the time period threshold is equal to the certain value for estimating the interest time period according to the time point $t_{36}$. The step (c) may be performed earlier than the step (d), so the video is played by the first speed during the time period between the time points $t_{16}$ and $t_{28}$ and during the time period between the time points $t_{34}$ and $t_{38}$ on the time line t. The time period between the time points $t_{16}$ and $t_{28}$ is slightly longer than the time period between the time points $t_{14}$ and $t_{18}$ defined according to the trajectory of the first object, and is slightly longer than the time period between the time points $t_{24}$ and $t_{28}$ defined according to the trajectory of the second object.

Therefore, this may provide an enough time for users to clearly observe multiple objects (e.g. the first and second objects).

What is claimed is:

1. A video playback method for object tracking in a surveillance system, comprising steps of:
   (a) acquiring metadata that is associated with a video and records a trajectory of at least one object appearing in the video;
   (b) detecting whether the trajectory at least overlaps a part of a preset region, and predefining a middle point on the trajectory and in the present region and defining a section of the trajectory based on the middle point according to the metadata when the trajectory at least overlaps the part of the preset region;
   (c) commanding that the video is played by a first speed when it is determined according to the metadata that the object appears on the section of the trajectory; and
   (d) selectively commanding that the video is played by a second speed when it is determined according to the metadata that the object appears on the trajectory except the section.

2. The video playback method according to claim 1, wherein the information about the trajectory comprises a plurality of locations of the object on the trajectory in the video and a timestamp corresponding to each of the locations of the object, the section of the trajectory comprises at least one middle point of the trajectory, the step (b) is performed based on the at least one middle point, and the processing method further comprises:

defining the at least one middle point according to the timestamps.

3. The processing video playback method according to claim 1, wherein the information about the trajectory comprises a plurality of locations of the object on the trajectory in the video and a timestamp corresponding to each of the locations of the object, the section of the trajectory comprises at least one middle point, the step (b) is performed based on the at least one middle point, and the processing method further comprises:

defining the at least one middle point according to the locations of the object.

4. The video playback method according to claim 1, wherein the information about the trajectory comprises a direction, length or pattern of the trajectory, which the step (b) is based on.

5. The video playback method according to claim 1, wherein the step (b) is performed when the trajectory at least partially overlaps at least a region of a frame of the video.

6. The video playback method according to claim 1, wherein a frame of the video comprises at least one first region and at least one second region, and the step (b) is performed when the trajectory at least partially overlaps the first region and the second region and the object appears to the first region and then appears to the second region.

7. The video playback method according to claim 1, wherein the section of the trajectory comprises at least one middle point of the trajectory, and the step (b) is performed according to a time period threshold that is associated with the at least one middle point which the object appears at.

8. The video playback method according to claim 1, wherein the first speed is slower than the second speed.

9. A surveillance system for object tracking by video playback, comprising:

a video capturing device, for capturing a video and generating metadata associated with the video, and the metadata recording a trajectory of at least one object appearing in the video; and a processing device, electrically connected to the video capturing device and configured to perform steps of:

(a) acquiring the metadata;

(b) detecting whether the trajectory at least overlaps a part of a preset region and predefining a middle point on the trajectory and in the present region and defining a section of the trajectory based on the middle point according to the metadata when the trajectory at least overlaps the part of the preset region;

(c) commanding that the video is played by a first speed when it is determined according to the metadata that the object appears on the section of the trajectory; and (d) selectively commanding that the video is played by a second speed when it is determined according to the metadata that the object appears on the trajectory except the section.

10. The surveillance system according to claim 9, further comprising:

a player, electrically connected to the processing device and configured to play the video according to commands of the processing device.

11. The surveillance system according to claim 9, wherein the information about the trajectory comprises a plurality of locations of the object on the trajectory in the video and a timestamp corresponding to each of the locations of the object, the section of the trajectory comprises at least one middle point of the trajectory, the step (b) is performed based on the at least one middle point, and the processing method further comprises:

defining the at least one middle point according to the timestamps.

12. The surveillance system according to claim 9, wherein the information about the trajectory comprises a plurality of locations of the object on the trajectory in the video and a timestamp corresponding to each of the locations of the object, the section of the trajectory comprises at least one middle point, the step (b) is performed based on the at least one middle point, and the processing method further comprises:

defining the at least one middle point according to the locations of the object.

13. The surveillance system according to claim 9, wherein the information about the trajectory comprises a direction, length or pattern of the trajectory, which the step (b) is performed based on.

14. The surveillance system according to claim 9, wherein the step (b) is performed when the trajectory at least partially overlaps at least one region of a frame of the video.

15. The surveillance system according to claim 9, wherein a frame of the video comprises at least one first region and at least one second region, and the step (b) is performed when the trajectory at least partially overlaps the first region and the second region and the object appears to the first region and then appears to the second region.

16. The surveillance system according to claim 9, wherein the section of the trajectory comprises at least one middle point of the trajectory, and the step (b) is performed according to a time period threshold that is associated with the at least one middle point which the object appears at.

17. The surveillance system according to claim 9, wherein the first speed is slower than the second speed.

* * * * *